United States Patent
Kim

(10) Patent No.: US 9,802,461 B2
(45) Date of Patent: Oct. 31, 2017

(54) COOLING SYSTEM FOR VEHICLE

(71) Applicant: HYUNDAI MOTOR COMPANY, Seoul (KR)

(72) Inventor: Jae Yeon Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 225 days.

(21) Appl. No.: 14/712,807

(22) Filed: May 14, 2015

(65) Prior Publication Data

US 2016/0121694 A1     May 5, 2016

(30) Foreign Application Priority Data

Oct. 31, 2014 (KR) .................. 10-2014-0150104

(51) Int. Cl.
*B60H 1/32*     (2006.01)
*B60H 1/08*     (2006.01)

(52) U.S. Cl.
CPC ...................... *B60H 1/08* (2013.01)

(58) Field of Classification Search
CPC ...... B60H 1/3208; B60H 1/3211; B60H 1/08; B60H 1/32; B60H 1/04; B60H 1/00492; B60H 1/3202; B60H 1/3204; B60H 1/00485; B60H 1/02; B60H 1/00642
USPC .......................................................... 62/160
See application file for complete search history.

(56) References Cited

U.S. PATENT DOCUMENTS

| | | | |
|---|---|---|---|
| 6,450,275 B1 | 9/2002 | Gabriel et al. | |
| 2005/0167169 A1* | 8/2005 | Gering | B60H 1/00278 237/12.3 B |
| 2009/0301411 A1* | 12/2009 | Iwasaki | B60H 1/00328 123/41.23 |
| 2010/0126438 A1* | 5/2010 | Kim | B60K 6/32 123/41.21 |
| 2010/0224429 A1* | 9/2010 | Akiyama | B60K 6/445 180/65.22 |
| 2012/0111003 A1* | 5/2012 | Kasuya | F01K 13/02 60/618 |

FOREIGN PATENT DOCUMENTS

| | | |
|---|---|---|
| JP | 2005-186879 A | 7/2005 |
| JP | 4970022 B2 | 7/2012 |
| JP | 2013-079614 A | 5/2013 |
| KR | 10-1054750 B1 | 8/2011 |

* cited by examiner

*Primary Examiner* — Mohammad M Ali
(74) *Attorney, Agent, or Firm* — McDermott Will & Emery LLP

(57) ABSTRACT

A cooling system for a vehicle comprises an engine cooling means that circulates a coolant to an engine and cools the coolant in an engine radiator, the engine being provided with a turbocharger; an electrical equipment cooling means that circulates the coolant to an electrical equipment comprising a motor and an electric power component, and cools the coolant in an integral radiator; and an air conditioner comprising a water-cooled condenser that primarily condenses a refrigerant and an air-cooled condenser coupled in series to the water-cooled condenser that secondarily condenses the refrigerant and that cools or heats a vehicle interior through the refrigerant, wherein the water-cooled condenser is disposed within the integral radiator and an intercooler mounted at an intake side of the engine uses the coolant to cool water and is connected to the electrical equipment cooling means.

9 Claims, 6 Drawing Sheets

COOLING SYSTEM FOR VEHICLE

CROSS-REFERENCE TO RELATED APPLICATION

This application claims priority to Korean Patent Application No. 10-2014-0150104 filed in the Korean Intellectual Property Office on Oct. 31, 2014, the entire content of which is incorporated herein by reference.

TECHNICAL FIELD

The disclosure relates to a cooling system for a vehicle. More particularly, the present disclosure relates to a cooling system for a vehicle that uses driving torque of a motor and an engine together and that supplies coolant to an intercooler and electrical equipment using one radiator and that operates in coordination with an air conditioner in a hybrid vehicle to which a turbocharger is applied.

BACKGROUND

Currently, there is increased interest in energy efficiency and in decreasing environmental pollution, leading to increased demand for the development of an environmentally-friendly vehicle that can substantially replace an internal combustion engine vehicle. Such an environmentally-friendly vehicle may be classified as an electric vehicle that is driven using a fuel cell or electricity as a power source, or as a hybrid vehicle that is driven using an engine and an electric battery.

An electric vehicle using a fuel cell converts the chemical reaction energy of oxygen and hydrogen to electrical energy to produce driving torque, and in this process, thermal energy is produced by the chemical reaction within the fuel cell. To preserve the performance of the fuel cell, it is essential to effectively remove the generated heat.

Similarly, a hybrid vehicle generates driving torque by driving a motor using electricity supplied from an electric battery or a fuel cell combined with an engine operating with a general fuel, and it is essential to effectively remove heat from the fuel cell, battery, and motor to preserve the performance of the fuel cell, battery, and motor.

Such a hybrid vehicle is operated in an electric vehicle ("EV") mode driven by a motor upon constant-speed driving, gentle driving, and low and medium constant-speed driving. Upon acceleration and rapid acceleration, an internal combustion engine and a motor are simultaneously driven, and upon high constant-speed driving, the motor is stopped and the hybrid vehicle is operated by the internal combustion engine.

Accordingly, a hybrid vehicle includes an engine cooling means for circulating and cooling coolant in an engine and an electrical equipment cooling means for circulating and cooling coolant in an electric power component including a motor.

However, in such a conventional hybrid vehicle, the engine cooling means, the electrical equipment cooling means, and an air conditioner for cooling and heating an interior of the vehicle are each formed with a separate closed and sealed circuit. This creates problems because a cooling module provided at the front side of the vehicle to supply a refrigerant or coolant to each means becomes complex and also the weight and the size increase.

To prevent interference with other components, the length of connection pipes connecting each means to a cooling module may increase to be longer than a necessary length. Smooth operation of each means may become difficult because resistance occurs due to the increased movement distance of the operation fluids.

As the maximum load conditions for the cooling means and the air conditioner are different, optimized control of each means is difficult and this deteriorates the efficiency and performance of each means. Power consumption also increases because of the increased operating time of a cooling fan and thus the entire fuel consumption of a vehicle increases.

Further, when the weight and size of a cooling module increase, it is difficult to secure sufficient collision space at the front side of the vehicle and thus there is a problem that collision safety regulations are not satisfied.

The above information disclosed in this Background section is only for enhancing the understanding of the background of the disclosure and therefore it may contain information that does not form the prior art that is already known in this country to a person of ordinary skill in the art.

SUMMARY OF THE DISCLOSURE

The present disclosure has been made in an effort to provide a cooling system for a vehicle having the advantage of being capable of supplying coolant both to an intercooler and to electrical equipment using one radiator that is coordinated with an air conditioner in a hybrid vehicle using a driving torque of a motor and an engine and to which a turbocharger is applied.

An embodiment of the present inventive concept provides a cooling system for a vehicle, comprising an engine cooling means that circulates a coolant to an engine and cools the coolant in an engine radiator, the engine being provided with a turbocharger; an electrical equipment cooling means that circulates the coolant to an electrical equipment comprising a motor and an electric power component, and cools the coolant in an integral radiator; and an air conditioner comprising a water-cooled condenser that primarily condenses a refrigerant and an air-cooled condenser coupled in series to the water-cooled condenser that secondarily condenses the refrigerant and that cools or heats a vehicle interior through the refrigerant, wherein the water-cooled condenser is disposed within the integral radiator, a cooling module comprising the engine radiator, the integral radiator, and the air-cooled condenser, the cooling module disposed at the front side of the vehicle, and connected to the engine cooling means, the electrical equipment cooling means, and the air conditioner, and an intercooler mounted at an intake side of the engine that uses the coolant to cool water and is connected to the electrical equipment cooling means.

The intercooler may be disposed in an electrical equipment cooling pipe disposed between the electrical equipment and the integral radiator and be coupled in series to the electrical equipment and the integral radiator.

The intercooler may be turned off when the vehicle is in an EV driving mode and be turned on when the vehicle is in an engine driving mode.

The electrical equipment may be turned on when the vehicle is in an EV driving mode and be turned off when the vehicle is in an engine driving mode.

The intercooler may be disposed in parallel to the electrical equipment through a sub-cooling pipe that is connected to an electrical equipment cooling pipe disposed between the electrical equipment and the integral radiator.

The intercooler may be turned off when the vehicle is in an EV driving mode and be turned on when the vehicle is in an engine driving mode.

The electrical equipment may be turned on when the vehicle is in an EV driving mode and be turned off when the vehicle is in an engine driving mode.

The sub-cooling pipe may be connected to the electrical equipment cooling pipe through a valve.

The valve may close the electrical equipment cooling pipe when the vehicle is in an engine driving mode and the air conditioner is operated, and may supply coolant to the intercooler by connecting the sub-cooling pipe to a pipe connected to the integral radiator.

The valve may close the sub-cooling pipe that is connected to the intercooler when the vehicle is in a motor driving mode and the air conditioner is operated, and may supply coolant from the integral radiator to the electrical equipment through the electrical equipment cooling pipe.

The electrical equipment cooling means may further comprise an electric water pump disposed between the integral radiator and the electrical equipment to circulate coolant.

The cooling module may comprise an integral radiator disposed at a front side of the engine radiator, an air-cooled condenser disposed at a front side of the integral radiator, and a cooling fan disposed at a rear side of the engine radiator.

The engine cooling means may comprise: a mechanical water pump disposed on a cooling pipe between the engine and the engine radiator that operates with a driving torque of the engine; and a thermostat disposed on the cooling pipe between the mechanical water pump and the engine radiator.

The air conditioner may comprise: an expansion valve that expands the refrigerant discharged from the air-cooled condenser; an evaporator that evaporates the refrigerant supplied from the expansion valve; and a compressor that compresses the refrigerant discharged from the evaporator and supplies the refrigerant to the water-cooled condenser.

DETAILED DESCRIPTION

Figure 1:
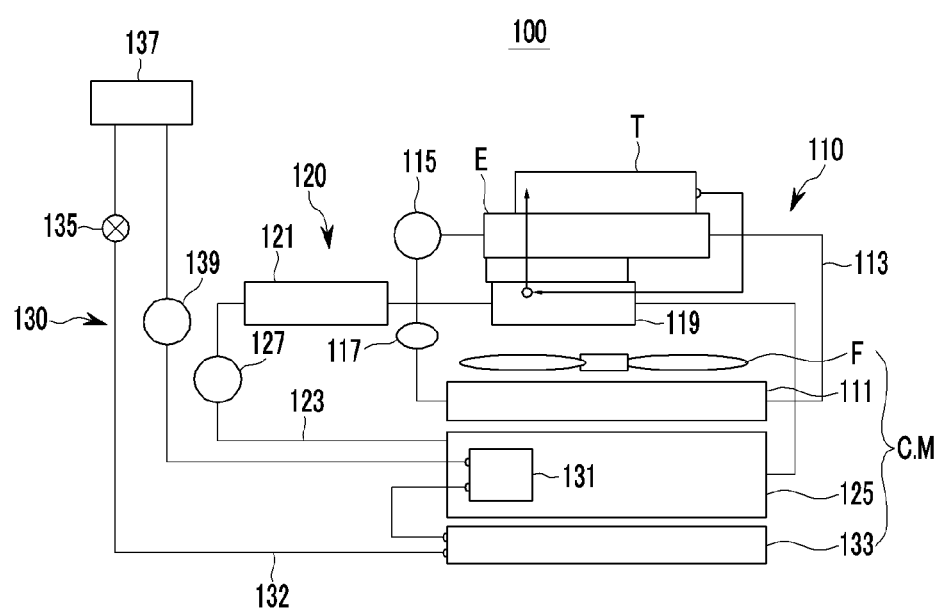
FIG. 1 is a block diagram illustrating a configuration of a cooling system for a vehicle according to an embodiment of the present inventive concept.

FIG. 1 is a block diagram illustrating a configuration of a cooling system for a vehicle according to an embodiment of the present inventive concept.

Referring to FIG. 1, a vehicle cooling system 100 according to an embodiment of the present inventive concept is applied to a hybrid vehicle using a driving torque of an engine E and a driving torque of a motor.

As shown in FIG. 1, a vehicle cooling system 100 may include an engine cooling means 110, an electrical equipment cooling means 120, and an air conditioner 130 that is configured to operate in coordination with the electrical equipment cooling means 120.

The engine cooling means 110 circulates and cools coolant that is cooled in an engine radiator 111 to an engine E in which a turbocharger T is provided through a cooling pipe 113.

Such an engine cooling means 110 further includes a mechanical water pump 115 that is provided on the cooling pipe 113 between the engine E and the engine radiator 111 and that operates with a driving torque of the engine E, and a thermostat 117 that is provided on the cooling pipe 113 between the mechanical water pump 115 and the engine radiator 111.

In the present embodiment, the electrical equipment cooling means 120 circulates and cools coolant that is cooled in an integral radiator 125 in electrical equipment 121 including a motor and an electric power component through an electrical equipment cooling pipe 123.

Such an electrical equipment cooling means 120 may further include an electric water pump 127 that is provided in the electrical equipment cooling pipe 123 between the integral radiator 125 and the electrical equipment 121 to circulate coolant.

The air conditioner 130 may include a water-cooled condenser 131 that primarily condenses a refrigerant and an air-cooled condenser 133 that is coupled in series to the water-cooled condenser 131 regardless of an operation mode to secondarily condense a refrigerant, and cools or heats a vehicle interior through a refrigerant that circulates along a refrigerant pipe 132.

The water-cooled condenser 131 may be housed within the integral radiator 125 to condense a refrigerant that is moved at the inside using coolant that circulates through the electrical equipment cooling means 120 as a heat exchange medium, thereby coordinating the electrical equipment cooling means 120 and the air conditioner 130.

As described above, the air conditioner 130 that is configured to coordinate with the electrical equipment cooling means 120 through the water-cooled condenser 131 may further include an expansion valve 135 that is connected through the refrigerant pipe 132 and that expands a refrigerant that is discharged from the air-cooled condenser 133, an evaporator 137 that evaporates the expanded refrigerant that is supplied from the expansion valve 135, and a compressor 139 that receives and compresses a refrigerant that is discharged from the evaporator 137 and that supplies the refrigerant to the water-cooled condenser 131.

In the present embodiment, a cooling module (hereinafter referred to as a C.M) that includes the engine radiator 111, the integral radiator 125, and the air-cooled condenser 133 to be disposed at the front side of the vehicle is connected to the engine cooling means 110, the electrical equipment cooling means 120, and the air conditioner 130 through the cooling pipe 113, the electrical equipment cooling pipe 123, and the refrigerant pipe 132.

Here, the C.M may include an integral radiator 125 that is disposed at the front side of the engine radiator 111, an air-cooled condenser 133 is disposed at the front side of the integral radiator 125, and a cooling fan F that is disposed at the rear side of the engine radiator 111.

The cooling fan F may blow air to the engine radiator 111, the integral radiator 125, and the air-cooled condenser 133 to cool the C.M together with flowing external air while driving the vehicle.

The vehicle cooling system 100 having such a configuration may have an intercooler 119 that is mounted at the intake side of the engine E with a water cooling method to connect the intercooler 119 to the electrical equipment cooling means 120 so as to cool through the coolant.

The intercooler 119 may cool external air that is supplied from the turbocharger T to supply the external air to the engine E, and cools the external air that is supplied from the turbocharger T using coolant that circulates through the electrical equipment cooling means 120.

Such an intercooler 119 may be disposed in the electrical equipment cooling pipe 123 between the electrical equipment 121 and the integral radiator 125, and is coupled in series to the electrical equipment 121 and the integral radiator 125.

When the vehicle is in an EV driving mode that drives with a driving torque of a motor, operation of the intercooler 119 may be turned off, and when the vehicle is in an engine driving mode that drives with a driving torque of the engine E, operation of the intercooler 119 may be turned on.

Further, unlike a case of the intercooler 119, when the vehicle is in an EV driving mode that drives with a driving torque of a motor, operation of the electrical equipment 121 may be turned on, and when a vehicle is in an engine driving mode that drives with a driving torque of the engine E, operation of the electrical equipment 121 may be turned off.

Accordingly, when the intercooler 119 is in an engine driving mode, while coolant that is cooled in the integral radiator 125 passes through the electrical equipment 121 in which operation is turned off, the coolant may be injected and smoothly cooled in a state in which heat exchange is not performed.

In contrast, in an EV driving mode of the vehicle, as operation of the intercooler 119 is turned off, when coolant that cools the electrical equipment 121 passes through the intercooler 119, heat exchange is not performed and thus a water temperature of coolant may be prevented from excessively increasing.

In the present embodiment, it is described that the intercooler 119 may be disposed between the electrical equipment 121 and the integral radiator 125 to be coupled in series, but the present inventive concept is not limited thereto, and a location of the electrical equipment 121 and the intercooler 119 may be changed and applied.

Hereinafter, operation on a driving mode basis by a driving torque of an engine or a motor of a vehicle cooling system 100 according to an embodiment of the present inventive concept having the foregoing configuration will be described in detail.

Figure 2:
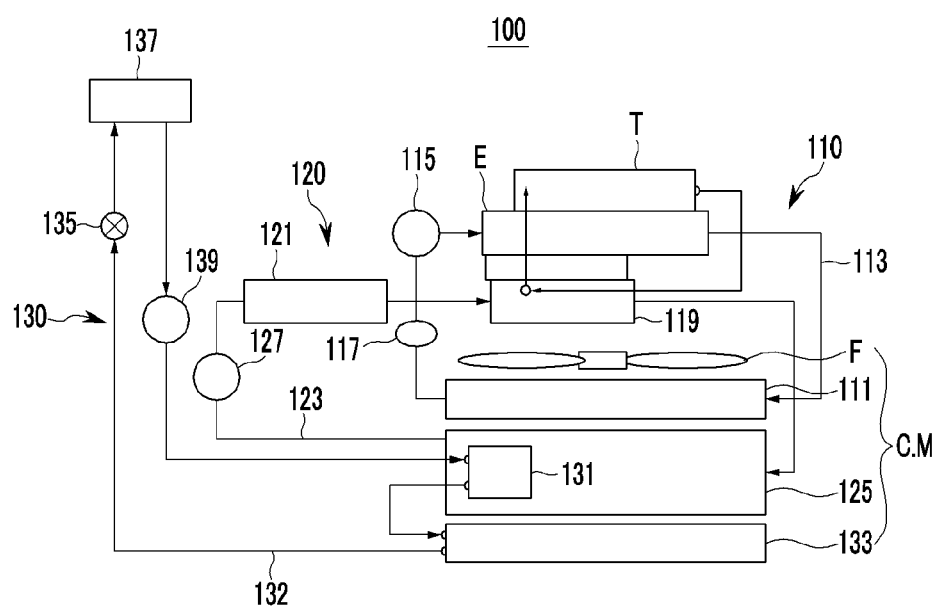
FIG. 2 is a diagram illustrating an operation state in an engine driving mode when operating an air conditioner in a cooling system for a vehicle according to an embodiment of the present inventive concept.
Figure 3:
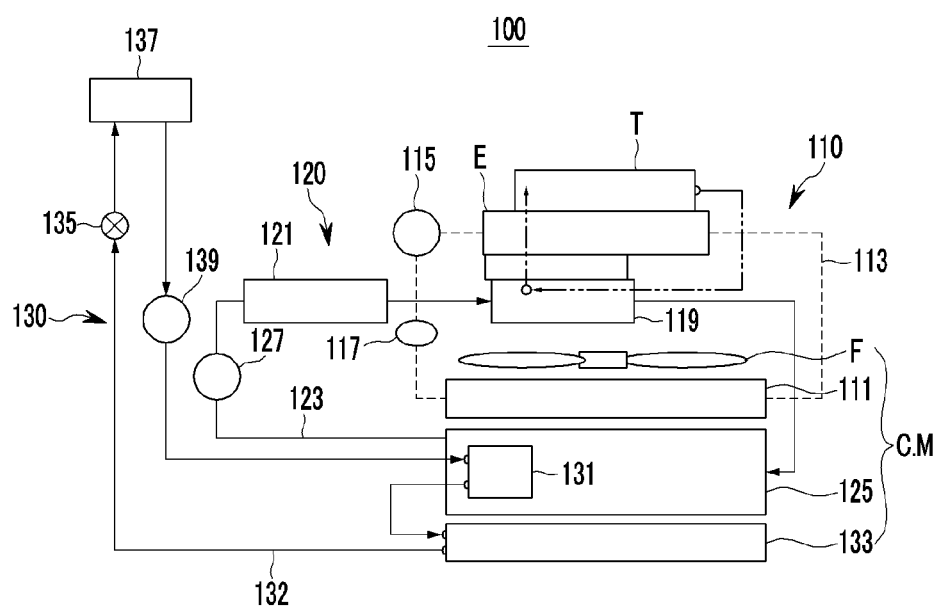
FIG. 3 is a diagram illustrating an operation state in an EV driving mode when operating an air conditioner in a cooling system for a vehicle according to an embodiment of the present inventive concept.

FIG. 2 is a diagram illustrating an operation state in an engine driving mode when operating an air conditioner in a cooling system for a vehicle according to an embodiment of the present inventive concept, and FIG. 3 is a diagram illustrating an operation state in an EV driving mode when operating an air conditioner in a cooling system for a vehicle according to an embodiment of the present inventive concept.

When operating an air conditioner of a vehicle, in an engine driving mode that is driven with a driving torque of an engine E, in a cooling system 100, as shown in FIG. 2, a mechanical water pump 115 of an engine cooling means 110 operates to inject and cool coolant that is cooled while passing through an engine radiator 111 to the engine E.

An electrical equipment cooling means 120 may circulate coolant through operation of an electric water pump 127, and as operation of electrical equipment 121 maintains a turn-off state, coolant that is cooled in an integral radiator 125 is injected into an intercooler 119 in a state that it does not exchange heat with the electrical equipment 121.

Accordingly, external air that is supercharged from a turbocharger T may exchange heat with cooled coolant that is supplied from the integral radiator 125 while passing through the intercooler 119 to be injected into the engine E in a cooled state.

An air conditioner 130 may comprise a compressor 139 that operates to circulate a refrigerant along a refrigerant line 132.

A refrigerant that is compressed in the compressor 139 is primarily condensed through heat exchange with coolant while passing through a water-cooled condenser 131 that is provided at the inside of the integral radiator 125, is injected into an air-cooled condenser 133, and is injected into an expansion valve 135 in a state of being secondarily condensed through heat exchange with external air.

Thereafter, a refrigerant that is expanded while passing through the expansion valve 135 is evaporated while passing through an evaporator 137 and is supplied again to the compressor 139.

In this way, when the air conditioner 130 operates, the air conditioner 130 cools a vehicle interior while repeating the foregoing refrigerant circulation.

When an air conditioner of the vehicle operates, in an EV driving mode that is driven with a driving torque of a motor, as shown in FIG. 3, in a cooling system 100, as a mechanical water pump 115 does not operate due to operation stop of an engine E, in the engine cooling means 110, circulation of coolant is stopped.

An electric water pump 127 of an electrical equipment cooling means 120 may operate to inject and cool coolant that is cooled while passing through an integral radiator 125 into electrical equipment 121.

Here, as operation of the electrical equipment 121 maintains a turn-on state, the electrical equipment 121 is cooled through coolant that is cooled in the integral radiator 125.

When coolant that cools the electrical equipment 121 passes through an intercooler 119 in which operation is turned off, the coolant is injected into the integral radiator 125 to be again cooled in a state in which heat exchange is not performed, thereby smoothly cooling the electrical equipment 121.

The air conditioner 130 circulates a refrigerant along a refrigerant line 132 through operation of a compressor 139 according to operation of the air conditioner 130, thereby cooling a vehicle interior.

That is, a vehicle cooling system 100 according to an embodiment of the present inventive concept can supply and cool coolant that is cooled in one integral radiator 125 to the electrical equipment 121 and the intercooler 119 in which ON/OFF operation is performed on the contrary according to each driving mode of selectively using a driving torque of the engine E or the motor, thereby reducing a size and a weight of the C.M.

The air conditioner 130 improves condensation efficiency of a refrigerant by together applying a water-cooled condenser 131 that is housed at the inside of the integral radiator 125 and an air-cooled condenser 133 that is disposed at the front side of the integral radiator 125, thereby together improving air conditioner operation fuel consumption and air conditioner performance.

A vehicle cooling system 200 according to another embodiment of the present inventive concept will be described with reference to FIG. 4.

Figure 4:
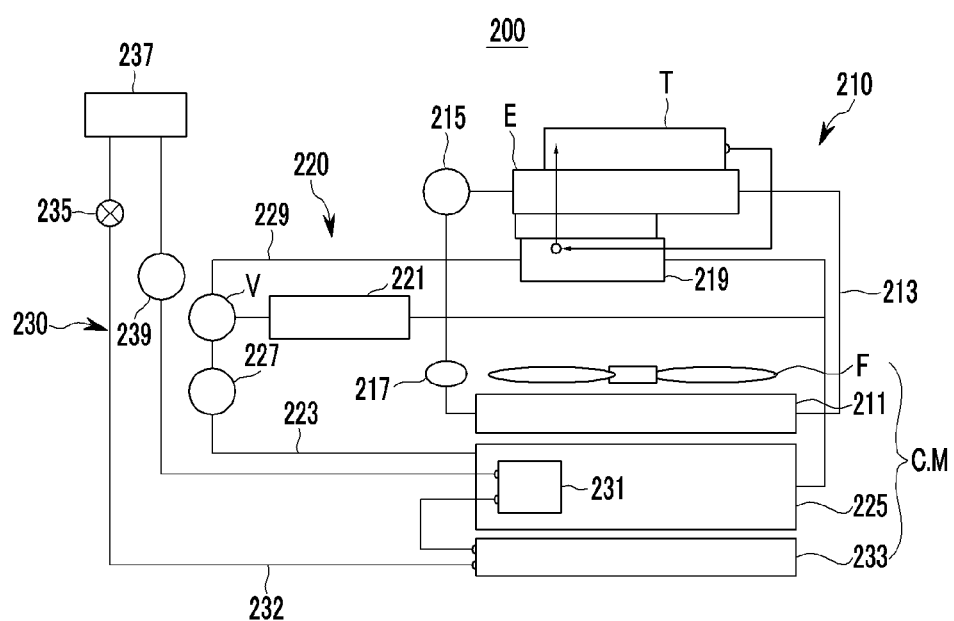
FIG. 4 is a block diagram illustrating a configuration of a cooling system for a vehicle according to another embodiment of the present inventive concept.

FIG. 4 is a block diagram illustrating a configuration of a cooling system for a vehicle according to another embodiment of the present inventive concept.

Referring to FIG. 4, a vehicle cooling system 200 according to another embodiment of the present inventive concept is different from the foregoing embodiment only in a disposition location of an intercooler 219 that is connected to an electrical equipment cooling means 220, and the remaining constituent elements are equally formed.

That is, a vehicle cooling system 200 according to another embodiment of the present inventive concept includes an engine cooling means 210, an electrical equipment cooling means 220, and an air conditioner 230 that is configured to operate in coordination with the electrical equipment cooling means 220, as in the foregoing embodiment.

The engine cooling means 210 circulates and cools coolant that is cooled in an engine radiator 211 to an engine E in which the turbocharger T is provided through a cooling pipe 213.

Such an engine cooling means 210 further includes a mechanical water pump 215 that is provided on the cooling pipe 213 between the engine E and the engine radiator 211 and that operates with a driving torque of the engine E, and a thermostat 217 that is provided on the cooling pipe 213 between the mechanical water pump 215 and the engine radiator 211.

In the present embodiment, the electrical equipment cooling means 220 circulates and cools coolant that is cooled in an integral radiator 225 to electrical equipment 221 including a motor and an electric power component through an electrical equipment cooling pipe 223.

Such an electrical equipment cooling means 220 may further include an electric water pump 227 that is provided in the electrical equipment cooling pipe 223 between the integral radiator 225 and the electrical equipment 221 to circulate coolant.

The air conditioner 230 may include a water-cooled condenser 231 that primarily condenses a refrigerant and an air-cooled condenser 233 that is coupled in series to the water-cooled condenser 231 regardless of an operation mode to secondarily condense a refrigerant and cools or heats a vehicle interior through a refrigerant that circulates along a refrigerant pipe 232.

Here, the water-cooled condenser 231 may be housed within the integral radiator 225 to condense a refrigerant that is moved at the inside using coolant that circulates through the electrical equipment cooling means 220 as a heat exchange medium, thereby coordinating the electrical equipment cooling means 220 and the air conditioner 230.

As described above, the air conditioner 230 that is configured to operate in coordination with the electrical equipment cooling means 220 through the water-cooled condenser 231 further includes an expansion valve 235 that is connected through the refrigerant pipe 232 and that expands a refrigerant that is discharged from the air-cooled condenser 233, an evaporator 237 that evaporates the expanded refrigerant that is supplied from the expansion valve 235, and a compressor 239 that receives and compresses a refrigerant that is discharged from the evaporator 237 to supply the refrigerant to the water-cooled condenser 231.

In the present embodiment, a cooling module (hereinafter referred to as C.M) that includes the engine radiator 211, the integral radiator 225, and the air-cooled condenser 233 and that is disposed at the front side of the vehicle is connected to the engine cooling means 210, the electrical equipment cooling means 220, and the air conditioner 230 through the cooling pipe 213, the electrical equipment cooling pipe 223, and the refrigerant pipe 232, respectively.

Here, the C.M may include an integral radiator 225 that is disposed at the front side of the engine radiator 211, an air-cooled condenser 233 that is disposed at the front side of the integral radiator 225, and a cooling fan F that is disposed at the rear side of the engine radiator 211.

The cooling fan F may blow air to the engine radiator 211, the integral radiator 225, and the air-cooled condenser 233 to cool the C.M together with external air that flows when driving the vehicle.

The vehicle cooling system 200 having such a configuration may have the intercooler 219 mounted at the intake side of the engine E with a water cooling method to be connected to the electrical equipment cooling means 220 so as to cool through coolant.

The intercooler 219 may cool external air that is supplied from the turbocharger T to supply the external air to the engine E, and cools the external air that is supplied from the turbocharger T using coolant that circulates through the electrical equipment cooling means 220.

When the vehicle is in an EV driving mode, operation of such an intercooler 219 may be turned off, and when the vehicle is in an engine driving mode, operation of such an intercooler 219 may be turned on.

Further, unlike operation of the intercooler 219, when the vehicle is in an EV driving mode, operation of the electrical equipment 221 may be turned on, and when the vehicle is in an engine driving mode, operation of the electrical equipment 221 may be turned off.

In another embodiment of the present inventive concept, the intercooler 219 is disposed in parallel at the electrical equipment 221 to be connected to the integral radiator 225 through a sub-cooling pipe 229 that is connected to the electrical equipment cooling pipe 223 between the electrical equipment 221 and the integral radiator 225.

The sub-cooling pipe 229 may be connected to the electrical equipment cooling pipe 223 that is connected to the integral radiator 225 through a valve V.

Here, in a state in which the air conditioner 230 is operated, when the vehicle is in an engine driving mode, the valve V closes the electrical equipment cooling pipe 223 that is connected to the electrical equipment 221, connects the sub-cooling pipe 229 to the electrical equipment cooling pipe 223 that is connected to the integral radiator 225 to supply coolant to the intercooler 219.

In contrast, in a state in which the air conditioner 230 is operated, when the vehicle is in a motor driving mode, the valve V closes the sub-cooling pipe 229 that is connected to the intercooler 219 and connects the electrical equipment cooling pipe 223 that is connected to the electrical equipment 221 to supply coolant that is supplied from the integral radiator 225 to the electrical equipment 221.

That is, in a vehicle cooling system 200 according to another embodiment of the present inventive concept, the intercooler 219 is disposed in parallel to the electrical equipment 221 of the electrical equipment cooling means 220 to be connected through the sub-cooling pipe 229 that is selectively connected to the electrical equipment cooling pipe 223 according to operation of the valve V.

Therefore, coolant that circulates through the electrical equipment cooling means 220 is selectively supplied to the intercooler 219 or the electrical equipment 221 according to a driving mode of the vehicle to cool the intercooler 219 or the electrical equipment 221.

Hereinafter, operation on a driving mode basis by a driving torque of an engine or a motor of a vehicle cooling system 200 according to another embodiment of the present inventive concept having the foregoing configuration will be described in detail.

Figure 5:
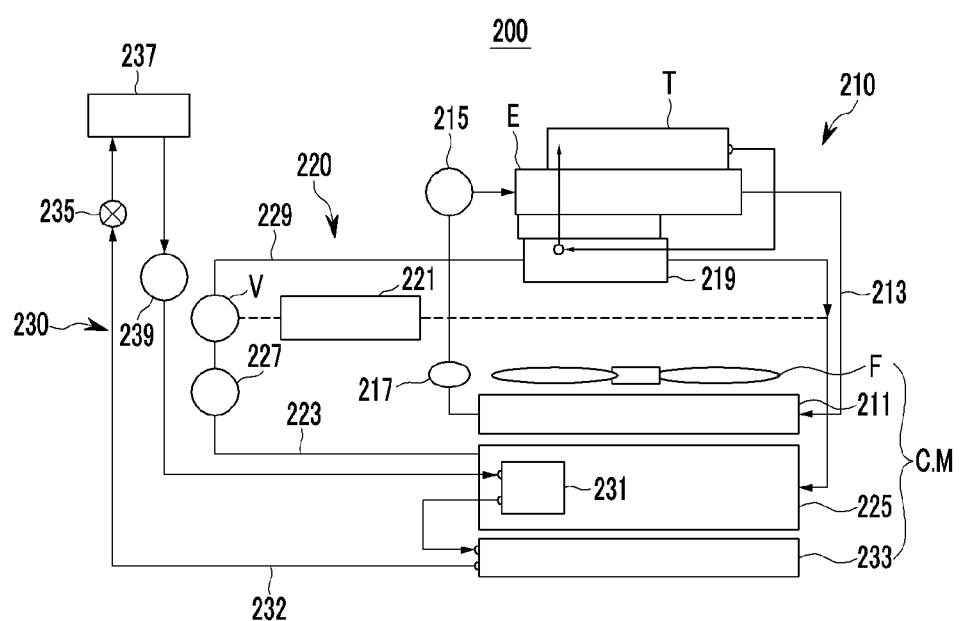
FIG. 5 is a diagram illustrating an operation state in an engine driving mode when operating an air conditioner in a cooling system for a vehicle according to another embodiment of the present inventive concept.
Figure 6:
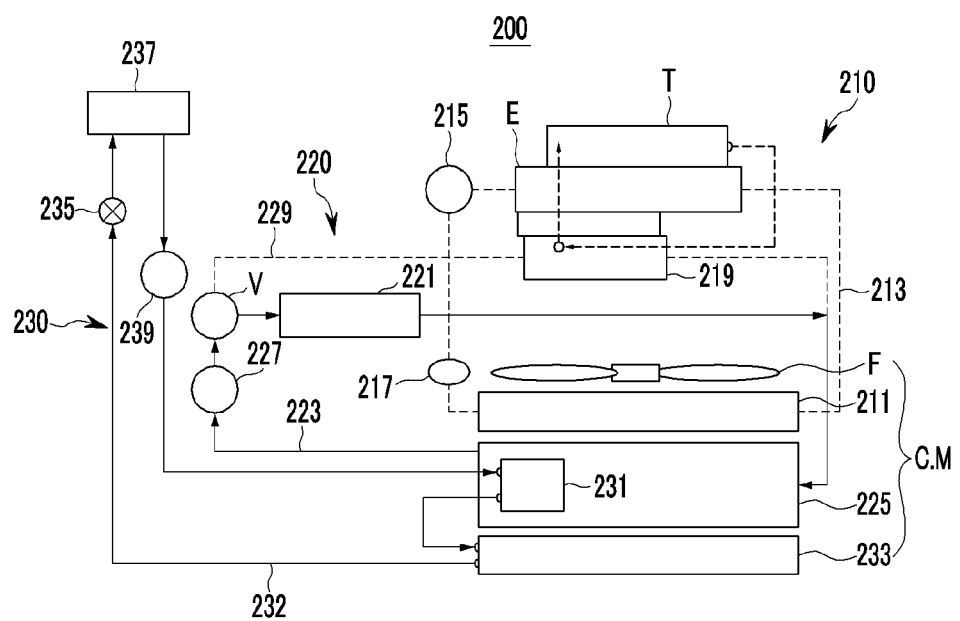
FIG. 6 is a diagram illustrating an operation state in an EV driving mode when operating an air conditioner in a cooling system for a vehicle according to another embodiment of the present inventive concept.

FIG. 5 is a diagram illustrating an operation state in an engine driving mode when operating an air conditioner in a cooling system for a vehicle according to another embodiment of the present inventive concept, and FIG. 6 is a diagram illustrating an operation state in an EV driving mode when operating an air conditioner in a cooling system for a vehicle according to another embodiment of the present inventive concept.

When operating an air conditioner of the vehicle, in an engine driving mode that is driven with a driving torque of an engine E, in a cooling system 200, as shown in FIG. 5, a mechanical water pump 215 of an engine cooling means 210 operates to inject and cool coolant that is cooled while passing through an engine radiator 211 to the engine E.

Electrical equipment cooling means 220 may circulate coolant through operation of an electric water pump 227.

In this case, a valve V may close an electrical equipment cooling pipe 223 that is connected to electrical equipment 221 and connects the electrical equipment cooling pipe 223 that is connected to an integral radiator 225 to a sub-cooling pipe 229.

Therefore, coolant that is cooled in the integral radiator 225 may be injected into an intercooler 219 in which operation is turned on through the sub-cooling pipe 229 to cool the intercooler 219.

Accordingly, external air that is supercharged from a turbocharger T may exchange heat with cooled coolant that is supplied from the integral radiator 225 while passing through the intercooler 219 to be injected into the engine E in a cooled state.

An air conditioner 230 may comprise a compressor 239 that operates to circulate a refrigerant along a refrigerant line 232.

A refrigerant that is compressed in the compressor 239 is primarily condensed through heat exchange with coolant while passing through a water-cooled condenser 231 that is provided at the inside of the integral radiator 225, is injected into an air-cooled condenser 233, and is injected into an expansion valve 235 in a state of being secondarily condensed through heat exchange with external air.

Thereafter, a refrigerant that is expanded while passing through the expansion valve 235 is evaporated while passing through an evaporator 237, and is supplied again to the compressor 239.

In this way, when the air conditioner 230 operates, the air conditioner 230 may cool a vehicle interior while repeating the foregoing refrigerant circulation.

When an air conditioner of the vehicle operates, in an EV driving mode that is driven with driving torque of a motor, as shown in FIG. 6, in a cooling system 200, as a mechanical water pump 215 does not operate due to operation stop of an engine E, in an engine cooling means 210, circulation of coolant is stopped.

An electrical equipment cooling means 220 may move coolant that is cooled while passing through an integral radiator 225 with operation of an electric water pump 227 along an electrical equipment cooling pipe 223.

Here, the valve V closes a sub-cooling pipe 229 that is connected to an intercooler 219, connects an electrical equipment cooling pipe 223 that is connected to electrical equipment 221, thereby injecting and cooling coolant that is cooled in the integral radiator 225 into the electrical equipment 221 in which operation is turned on.

By operating a compressor 239 according to operation of an air conditioner 230, an air conditioner 230 may circulate a refrigerant along a refrigerant line 232.

The air conditioner 230 may circulate a refrigerant along the refrigerant line 232 by repeating the foregoing process through operation of the compressor 239 according to operation of an air conditioner 230, thereby cooling a vehicle interior.

That is, a vehicle cooling system 200 according to another embodiment of the present inventive concept can supply and cool coolant that is cooled in one integral radiator 225 to the electrical equipment 221 and the intercooler 219 in which ON/OFF operation is performed according to each driving mode of selectively using a driving torque of the engine E or the motor, thereby reducing a size and a weight of the C.M.

Further, by together applying a water-cooled condenser 231 that is housed within the integral radiator 225 and an air-cooled condenser 233 that is disposed at the front side of the integral radiator 225, the air conditioner 230 improves condensation efficiency of a refrigerant, thereby improving both air conditioner operation fuel consumption and air conditioner performance.

Therefore, when applying vehicle cooling systems 100 and 200 according to an embodiment of the present inventive concept having the above-described configuration, driving torques of a motor and an engine are used together, and in a hybrid vehicle to which the turbocharger T is applied, by enabling coolant to be supplied to the intercoolers 119 and 219 and the electrical equipments 121 and 221 using one of integral radiators 125 and 225 that are configured to coordinate with the air conditioner 130 and 230, air conditioner performance, cooling efficiency, and cooling performance can be improved.

Further, by applying either of integral radiators 125 and 225 to cooling of the electrical equipment cooling means 120 and 220 and the intercoolers 119 and 219, entire size and weight of the C.M that is disposed at the front side of the vehicle can be reduced and a collision space can be increased, thereby satisfying collision safety regulations.

Further, by reducing a size and a weight of the C.M, it is possible to reduce the capacity and operating time of the cooling fan F. By minimizing power consumption of the cooling fan F, overall fuel consumption of the vehicle can be improved and production cost can be reduced.

While this inventive concept has been described in connection with what is presently considered to be multiple practical embodiments, it is to be understood that the inventive concept is not limited to the disclosed embodiments. On the contrary, it is intended to cover various modifications and equivalent arrangements included within the spirit and scope of the appended claims.

What is claimed is:

1. A cooling system for a vehicle, comprising:
    an engine cooling device that circulates a coolant to an engine and cools the coolant in an engine radiator, the engine being provided with a turbocharger;
    an electrical equipment cooling device that circulates the coolant to an electrical equipment comprising a motor and an electric power component, and cools the coolant in an integral radiator; and
    an air conditioner comprising a water-cooled condenser that primarily condenses a refrigerant and an air-cooled condenser coupled in series to the water-cooled condenser that secondarily condenses the refrigerant and that cools or heats a vehicle interior through the refrigerant, wherein the water-cooled condenser is disposed within the integral radiator, a cooling module comprising the engine radiator, the integral radiator, and the air-cooled condenser is disposed at the front side of the vehicle and connected to the engine cooling device, the electrical equipment cooling device, and the air conditioner, and an intercooler mounted at an intake side of the engine uses the coolant to cool water and is connected to the electrical equipment cooling device, wherein the intercooler is disposed in parallel to the electrical equipment through a sub-cooling pipe that is connected to an electrical equipment cooling pipe disposed between the electrical equipment and the integral radiator;

wherein the sub-cooling pipe is connected to the electrical equipment cooling pipe through a valve; and wherein the valve closes the electrical equipment cooling pipe when the vehicle is in an engine driving mode and the air conditioner is operated, and supplies coolant to the intercooler by connecting the sub-cooling pipe to a pipe connected to the integral radiator.

2. The cooling system of claim 1, wherein the intercooler is turned off when the vehicle is in an EV driving mode and is turned on when the vehicle is in an engine driving mode.

3. The cooling system of claim 1, wherein the electrical equipment is turned on when the vehicle is in an EV driving mode and is turned off when the vehicle is in an engine driving mode.

4. The cooling system of claim 1, wherein the valve closes the sub-cooling pipe when the vehicle is in a motor driving mode and the air conditioner is operated, and supplies coolant from the integral radiator to the electrical equipment through the electrical equipment cooling pipe.

5. The cooling system of claim 1, wherein the electrical equipment cooling device further comprises an electric water pump disposed between the integral radiator and the electrical equipment.

6. The cooling system of claim 1, wherein the cooling module comprises an integral radiator disposed at a front side of the engine radiator, an air-cooled condenser disposed at a front side of the integral radiator, and a cooling fan disposed at a rear side of the engine radiator.

7. The cooling system of claim 1, wherein the engine cooling device comprises:
a mechanical water pump disposed on a cooling pipe between the engine and the engine radiator that operates with a driving torque of the engine; and
a thermostat disposed on the cooling pipe between the mechanical water pump and the engine radiator.

8. The cooling system of claim 1, wherein the air conditioner comprises:
an expansion valve that expands the refrigerant discharged from the air-cooled condenser;
an evaporator that evaporates the refrigerant supplied from the expansion valve; and
a compressor that compresses the refrigerant discharged from the evaporator and supplies the refrigerant to the water-cooled condenser.

9. The cooling system of claim 1, wherein the water-cooled condenser disposed within the integral radiator enables the electrical equipment cooling device and the air conditioner to operate in a coordinated manner.

* * * * *